United States Patent
Asai et al.

(10) Patent No.: US 6,354,411 B1
(45) Date of Patent: *Mar. 12, 2002

(54) DRUM BRAKE DEVICE

(75) Inventors: Seiji Asai, Okazaki; Takashi Ikeda; Yasushi Kobayashi, both of Nagoya, all of (JP)

(73) Assignee: Nisshinbo Industries, Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/094,572

(22) Filed: Jun. 12, 1998

(30) Foreign Application Priority Data

Aug. 5, 1997 (JP) .............................................. 9-223187

(51) Int. Cl.[7] .............................................. F16D 51/24
(52) U.S. Cl. ............... 188/328; 188/250 R; 188/250 A; 188/106 F
(58) Field of Search ........................... 188/78, 325–331, 188/106 F, 106 A, 250 R, 250 G, 250 B, 250 A

(56) References Cited

U.S. PATENT DOCUMENTS

| | | | |
|---|---|---|---|
| RE22,586 E | | 1/1945 | Spiller et al. |
| 3,064,767 A | * | 11/1962 | Wieger .......................... 188/78 |
| 3,194,359 A | * | 7/1965 | Richards ....................... 188/216 |
| 4,071,123 A | * | 1/1978 | Courbot et al. ............. 188/331 |
| 4,732,240 A | * | 3/1988 | Flaim ........................... 188/78 |
| 4,981,200 A | | 1/1991 | Gee |
| 5,002,159 A | * | 3/1991 | Brix et al. ................... 188/2 D |
| 5,590,747 A | * | 1/1997 | Mery et al. .................. 188/326 |
| 5,630,486 A | * | 5/1997 | Maligne ....................... 188/328 |

FOREIGN PATENT DOCUMENTS

EP    0 286 254    12/1988

* cited by examiner

Primary Examiner—Douglas C. Butler
Assistant Examiner—Bradley King
(74) Attorney, Agent, or Firm—Liniak, Berenato, Lonacre & White

(57) ABSTRACT

A drum brake device in which the brake shoe return smoothly when releasing the parking brake on a slope. The points of the circumferential edges of the linings 6, 6 of the brake shoes 2, 3 at the service brake actuator side are located on the normal radial line B passed through the point of abutment of shoe clearance adjustment device 12 with the brake shoes 2, 3 and the brake center or are located closer to the anchor 9 than the line B.

1 Claim, 8 Drawing Sheets

DRUM BRAKE DEVICE

BACKGROUND OF THE INVENTION

This invention relates to a drum brake device enabling a smooth return of the brake shoe when the parking brake is released.

A drum brake device that functions as a leading-trailing (LT) type when the service brake is applied and as a duo-servo (DS) type when the parking brake is applied has been disclosed in U.S. Pat. No. 5,275,260 and Australian Patent No. AU-BI-53 491/79.

This device is explained with reference to FIG. 8. The wheel cylinder b and the anchor block c, are provided on the upper and lower parts of the back plate a. The upper and lower ends of a pair of brake shoes d, e engage the wheel cylinder b and the anchor block c, respectively.

Shoe return springs f, g, extend between the upper ends of the brake shoes d, e and between the lower ends of the brake shoes d, e, respectively. A parking brake lever h is pivotably provided at the lower part of the brake shoe d at the left side. The central region of a pivot lever i is pivoted so as to swing on the central region of the brake shoe e at the right side. A rod j bridges between the brake shoes d and e adjacent to the anchor block c. The left end of the rod j engages with the brake shoe d and the parking lever h while the right end of the rod j engages with the lower ends of the brake shoe e and the pivot lever i.

A screw type shoe clearance adjustment device k is provided between the brake shoes d and e adjacent to the wheel cylinder. The left end of the shoe clearance adjustment device k engages with the brake shoe d while the right end engages with the upper parts of the brake shoe e and the pivot lever i.

The above-explained drum brake device functions as a LT type brake where both brake shoes d, e spread open with the point of abutment with the anchor block c as the fulcrum when the wheel cylinder b operates to activate the service brake.

When the parking brake is operated, the rotating force of the parking lever h is transmitted to the rod j, the pivot lever i, and the shoe clearance adjustment device k, in order, and the brake shoe d at the left side spreads open with the point of abutment with the anchor block c as the fulcrum and frictionally engages the brake drum n. The pivot lever i rotates with the point of abutment with the shoe clearance adjustment device k as the fulcrum, and then the brake shoe e at the right side pivotably supporting the pivot lever i spreads open to frictionally engage with the brake drum n. The reaction force of the parking lever h affects the lower end of the brake shoe d at the left side.

Furthermore, if a rotational force in the direction of arrow R is applied to the brake drum n when a vehicle is stopped on a downhill or an uphill slope, the frictional force of the brake shoe d at the left side is transmitted via the shoe clearance adjustment device as the force needed to open the brake shoe e at the right side. In addition, when the rotational force is applied in the direction opposite of arrow R, the frictional force of the brake shoe e at the right side is transmitted via the shoe clearance adjustment device k to the brake shoe d at the left side. Accordingly, this drum brake device functions as a DS type brake when the parking brake is in operation.

Generally, when a vehicle is stopped on a slope, the vehicle is stopped by the service brake first, the parking brake is operated while the service brake is in operation, and then the service brake is released. When the service brake is released after setting the parking brake, for example, the brake drum n slightly rotates with the wheel, in the direction of arrow R due to gravity, which creates the braking force.

Very often when a vehicle is starting on a slope, the driver starts the vehicle moving, especially a vehicle with an automatic transmission, while releasing the parking brake without stepping on the service brake.

At this time, if the vehicle is moving to rotate the drum n in the direction opposite of arrow R, the brake shoe d turns with the brake drum n until contacting the anchor block c, and the brake shoe d smoothly returns to the starting position by the return spring force without any problem.

However, if the vehicle is moving to rotate the drum n in the direction of arrow R, one brake shoe d may cause dragging or biting. That is, as shown in FIG. 9, the shoe clearance adjustment device k becomes a prop, and the circumferential edge s of the lining q on the brake shoe d located closer to the wheel cylinder b side than the normal line B passing through the point of abutment P of the shoe clearance adjustment device k with the brake shoe d to the brake center O. Therefore, the circumferential edge s of lining q is pressed in the direction A1, that is, in the direction of the frictional surface of the brake drum, with the point of abutment P as the fulcrum by the force of the return spring, which may cause dragging and brake locking.

Also, when the vehicle is moving to rotate the drum n in the direction opposite of arrow R in the condition that the brake shoe d abuts against the anchor block c and the brake shoe e separates from the anchor block c with the parking brake in operation, the same type of problem described above can be clearly seen with respect to the other brake shoe e.

OBJECTS AND SUMMARY OF THE INVENTION

This invention is provided to resolve the problems above, and to that end, the object of the invention is to provide a drum brake device which realizes a smooth return of the brake shoe whenever the parking brake is released.

The present invention is a drum brake device comprising a back plate, two brake shoes set to face each other on top of the back plate, a service brake actuator activated by a service brake mounted on top of the back plate between one pair of first adjacent ends of the brake shoes, an anchor mounted on the back plate between the other pair of second adjacent ends of the brake shoes, a shoe clearance adjustment device provided adjacent to the service brake actuator and provided between the brake shoes, a parking brake actuator comprising by a parking brake lever and a strut adjacent to the anchor, linings provided on the two brake shoes, and a pivot lever pivotably mounted at a pivot point at the central region of one brake shoe, one end of the pivot lever and the other end of the pivot lever respectively being functionally engaged with the shoe clearance adjustment device and the parking brake actuator; wherein a circumferential edge of each lining of the brake shoe at the service brake actuator side is located on the normal radial line passing through a point of abutment of said brake shoe with the automatic shoe clearance adjustment device and the brake center or at a point closer to the anchor than that normal radial line.

The invention further is a drum brake device as above wherein a chamfer is formed at the end of the lining at the circumferential end on each of the shoes.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

The first embodiment of this invention is explained with reference to FIGS. 1–5.

Figure 1:
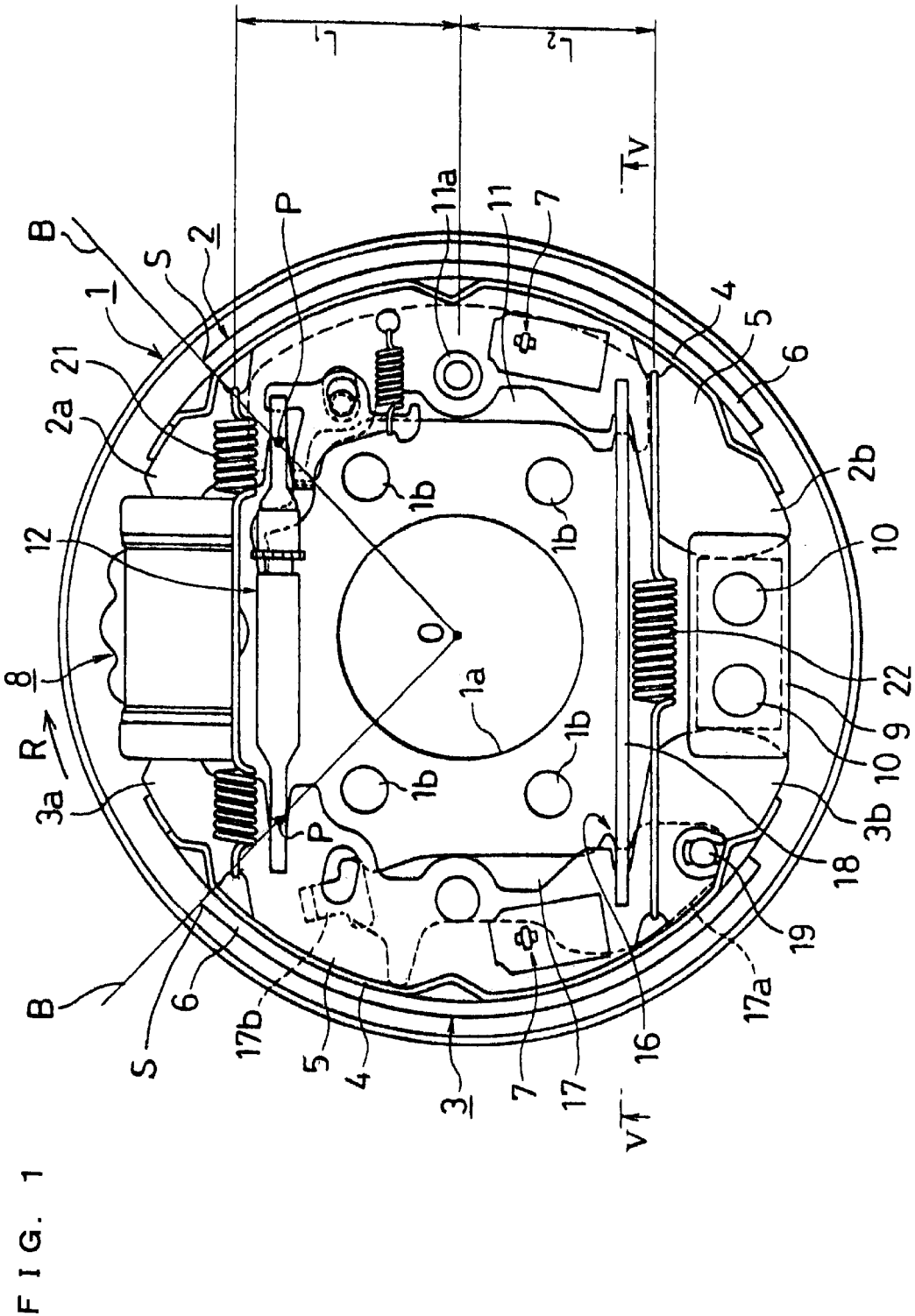
FIG. 1 is a plan view of the first embodiment of the drum brake device of this invention.

As shown in FIG. 1, the center hole 1a of the back plate 1 is to be fitted over the vehicle axle with a gap and is affixed to the stationary part of the vehicle by bolts through a plural number of bolt holes 1b.

The pair of brake shoes 2, 3 include shoe webs 5, 5 fixed on the inner surface of the curved shoe rims 4, 4, so as to form a T-shaped section when cross-sectioned. Linings 6, 6 are fixed on the outer surfaces of the shoe rims 4, 4. The linings 6, 6 frictionally engage with the brake drum, not shown in the diagram, to brake the brake drum. The brake shoes 2,3 are elastically supported on the back plate by conventional shoe hold devices 7, 7 comprising a known plate spring and pin.

The fixing points of the linings 6, 6 of the brake shoes 2, 3 at the service brake actuator 8 side, i.e., the points of the circumferential edges s, s of the linings 6, 6, are located on the normal, radial lines B, B passing through the point of abutment P, P of the brake shoes 2, 3 with the shoe clearance adjustment device 12 and the brake center O, or the points of the circumferential edges s, s are located closer to the anchor 9 than the line B, B. Strictly speaking, the points of the circumferential edges s, s are to be measured when the parking brake is in operation; the amount of displacement, however, does not need to be considered since it is too minor.

This provides a smooth return of the brake shoes 2, 3 to prevent the dragging of the brake shoes 2, 3, and to prevent the brake shoes 2, 3 being locked.

The service brake actuator 8 is a fluid pressure type or an air pressure type cylinder, which is activated when the service brake is operated. The service brake actuator 8 is provided between the adjacent ends 2a and 3a of the brake shoes 2, 3, facing each other, and is mounted on the back plate 1 by bolts, etc.

The anchor 9 is affixed on the back plate 1 by rivets 10, 10 and supports the other adjacent ends 2b, 3b of the brake shoes 2, 3. The anchor 9 may be affixed by welding instead of using rivets 10, 10, and a pin-shaped anchor pin may be used instead of the rectangular plate.

The drum brake device is equipped with the pivot lever 11 in order to transmit the frictional force that occurs at each of the brake shoes 2, 3 to the other shoe during parking brake operation.

Figure 3:
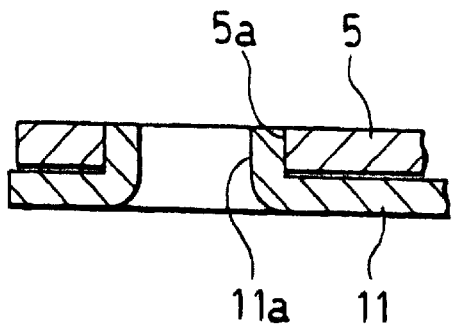
FIG. 3 is a cross section view taking along the line III—III in FIG. 2.

The pivot lever 11 is placed under the shoe web 5 of the brake shoe 2 at the right side. A protuberance 11a formed at the central region of the pivot lever 11 is pivotably inserted in a hole 5a of the shoe web 5 as can be seen in FIG. 3. Alternatively, another pin may easily be used for the pivot lever 11 to pivotably be supported on the shoe web 5 instead of the above-described structure of using the protuberance 11 a and the hole 5a.

Adjacent to the service brake actuator 8, the shoe clearance adjustment device 12 is provided between the brake shoes 2 and 3. Shown in FIG. 2, the shoe clearance adjustment device 12 is a known screw type adjustment device to adjust the clearance between the brake drum, not shown in the diagram, and the brake shoes 2, 3. The shoe clearance adjustment device 12 comprises a bolt 13 with a toothed adjuster 13a, a tube 14 threadingly fitting on one end of the bolt 13, and a socket 15 rotatably fitting with the other end of the bolt 13. Inserting a device such as a screwdriver through a hole, not shown in the diagram, formed in the back plate 1 or in the brake drum, the entire length of the shoe clearance adjustment device 12 may be adjusted by screwing the bolt 13 with the toothed adjuster 13a to screw the part of the bolt 13 out from or into the tube 14.

One end of each above-described tube 14 and socket 15 are pressed to form plate-shaped ends. The ends each have a notched groove 14a, 15a. The bottom of the notched groove 14a abuts against a notched groove 5b formed at the shoe web 5 of the other brake shoe 3. The bottom of the notched groove 15a abuts against a notched groove 5b formed at the shoe web 5 of the one brake shoe 2. A slight clearance is provided between the bottom of the notched groove 11c of the pivot lever 11 and the bottom of the notched groove 15a in consideration of manufacturing tolerances.

Figure 2:
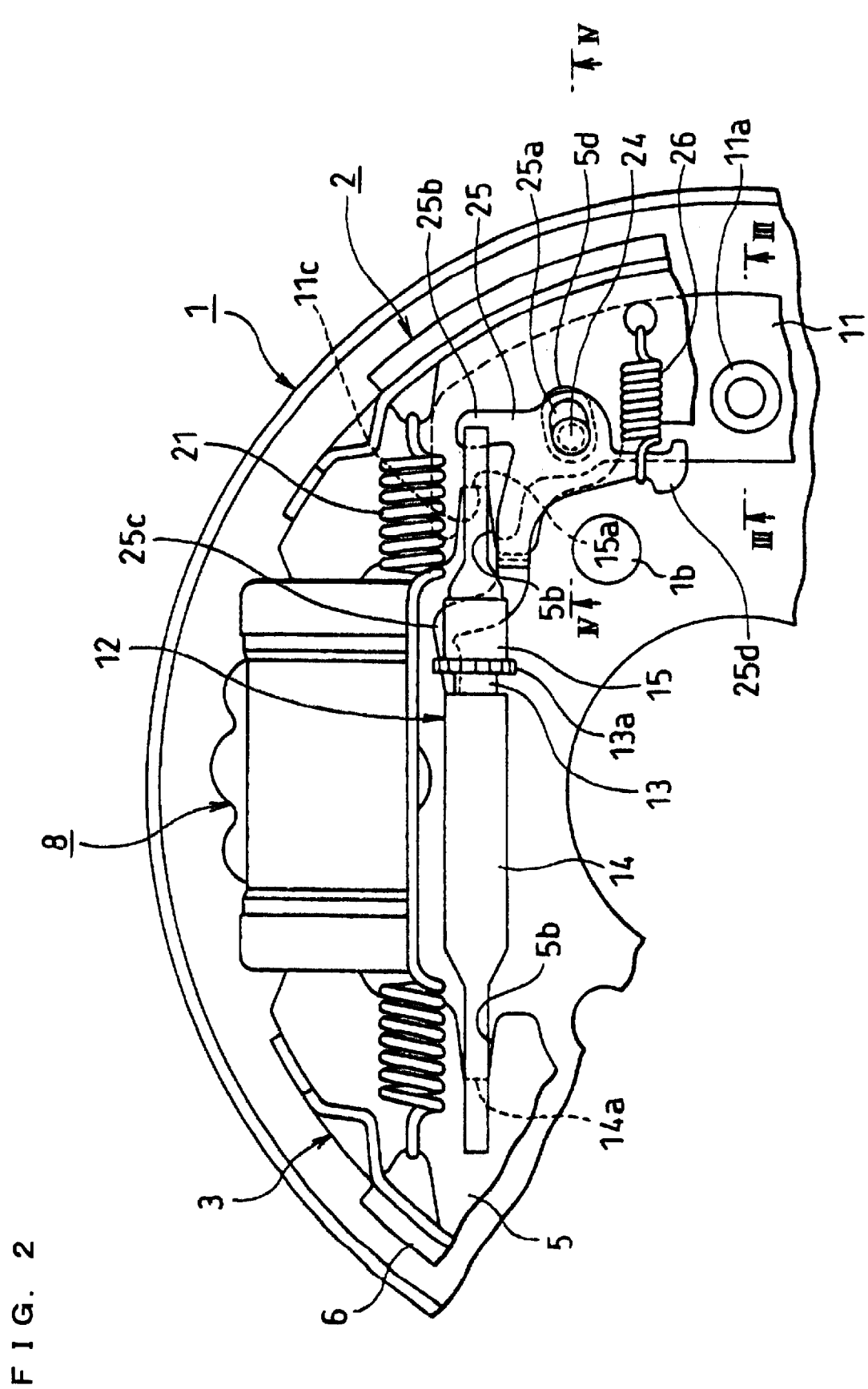
FIG. 2 is an enlarged plan view of the parts adjacent to the service brake actuator of the drum brake device of this invention.
Figure 4:
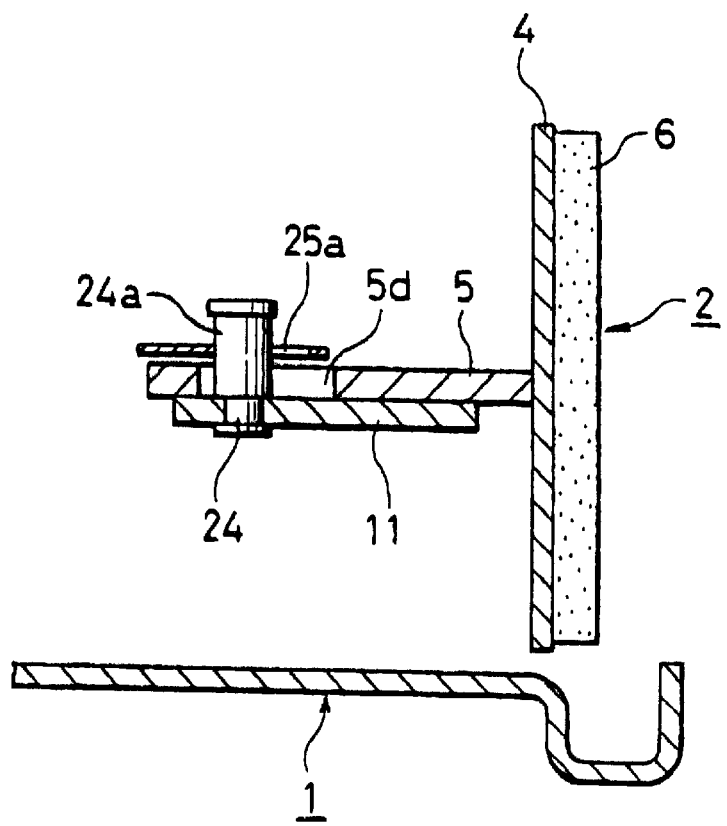
FIG. 4 is a cross section view taking along the line IV—IV in FIG. 2.

An incremental type automatic shoe clearance adjustment device, activating when the service brake in operation, is explained with reference to FIGS. 2 and 4. A pin 24 fixed at one side of the pivot lever 11 is vertically set to freely protrude through a long hole 5d of the shoe web 5 of the one brake shoe 2. A stem 24a of the pin 24 pivotably supports an adjustment lever 25 via a hole 25a formed at the central region of the adjustment lever 25. An arm 25b of the adjustment lever 25 abuts against the stepped surface of the notched groove 15a of the socket 15. Another arm 25c of the adjustment lever 25 engages the toothed adjuster 13a of the bolt 13. An adjustment spring 26 is extended between the another arm 25d and the shoe web 5 and provides the adjustment lever 25 with a counterclockwise spring force with the pin 24 as the fulcrum.

As shown in FIG. 1, the parking brake actuator 16 activated when the parking brake is operated is provided adjacent to the anchor 9. The parking brake actuator 16 comprises a forward-pull type brake lever 17 and the strut 18, etc as conventionally known.

The brake lever 17 is mounted under the shoe web 5 of the brake shoe 3. The basal part 17a of lever 17 is pivotably supported by a pin 19 at the other end 3b of the brake shoe 3. A U-shaped bent groove is formed at the free end 17b of the lever 17 to hold the parking brake cable, not shown in the diagram.

Figure 5:
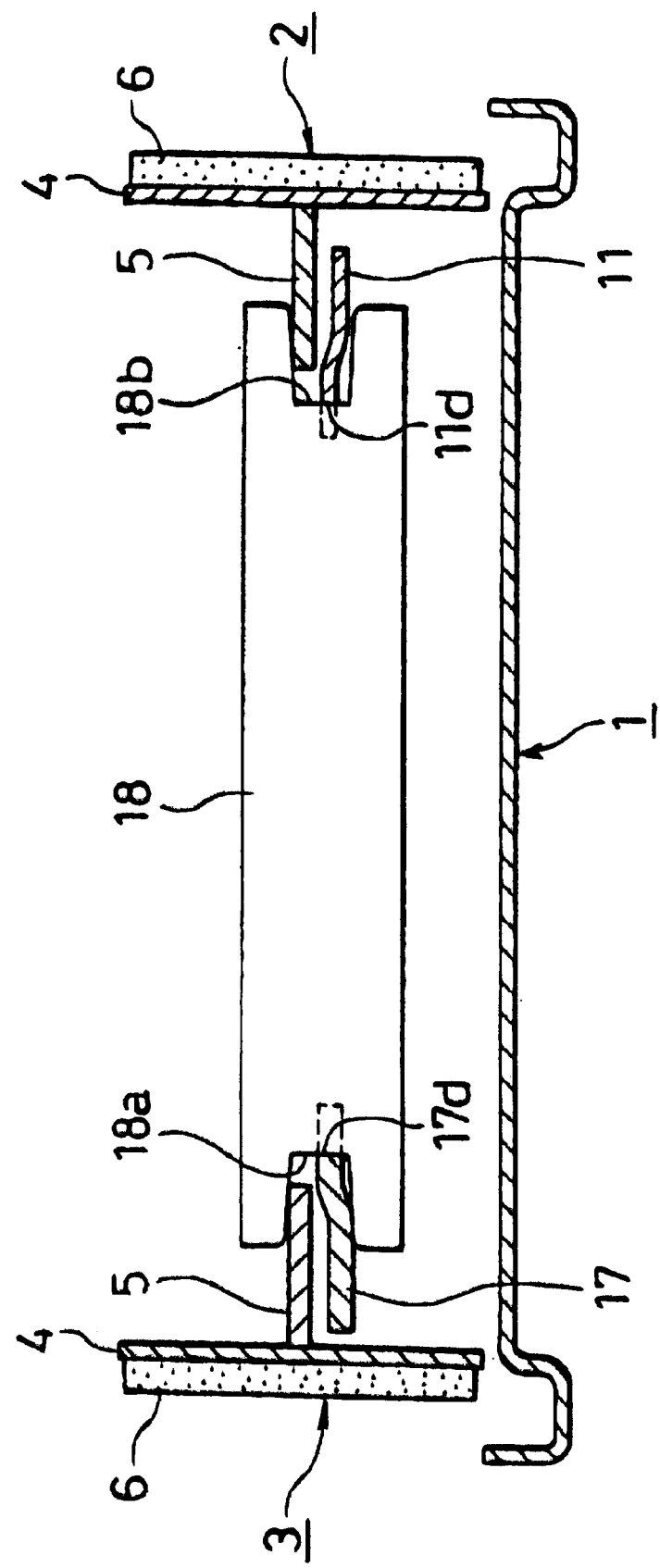
FIG. 5 is a cross section view taking along the line V—V in FIG. 1.

As shown in FIG. 5, the notched grooves 18a, 18b, are formed at the ends of the plate-shaped strut 18. The bottom of the notched groove 18a abuts against the bottom of the notched groove 17d of the brake lever 17 urged there by the spring force of the adjustment spring 26. The bottom of the notched groove 18b abuts against the bottom of the notched groove 11d formed at the other end of the pivot lever 11.

In the above-described structure, as both brake shoes 2, 3 spread open by operating the service brake, the shoe clearance adjustment device 12 follows the other brake shoe 3. The pivot lever 11 follows one brake shoe 2, and at that time, the lever 11 rotates clockwise in FIG. 1 by the spring force of the adjustment spring 26 with the protuberance 11a as the fulcrum. Accordingly, the adjustment lever 25 rotates counter-clockwise in FIG. 1 to the amount of the rotation of the pin 24 plus the amount of the movement of the shoe clearance adjustment device 12.

At this time, if the linings 6, 6 are worn down and the amount of rotation of the arm 25c of the adjustment lever 25 exceeds a pitch between two adjacent teeth of the toothed adjuster 13a, the bolt 13 is screwed out from the tube 14 in order to maintain a constant clearance between the brake drum, not shown in the diagram, and the linings 6, 6.

Also, when the parking brake is in operation, the shoe clearance adjustment device 12, the pivot lever 11, adjustment lever 25, etc., follow together to the amount of opening of the other brake shoe 3, therefore, the parking brake operation does not effect an automatic adjustment operation.

As in FIG. 1, return springs 21, 22, are extended between the upper ends of the brake shoes 2, 3 and between the lower ends of the brake shoes 2, 3. Even if the brake lever 17 is set to be pulled slightly, the moment at the lower return spring 22 side is larger than the moment at the upper return spring 21 side, so that the anchor side end 2b of the brake shoe 2 is not detached from the anchor 9 when the brake is inactive. That is, provided that the mounting load of the upper return spring 21 is F1, the mounting load of the lower return spring 22 is F2, the length from the pivot point between the brake shoe 2 and the pivot lever 11 to the upper return spring 21 is L1, and the length from the pivot point between the brake shoe 2 and the pivot lever 11 to the lower return spring 22 is L2, the device is to be structured to set the moment effecting on the brake shoe 2 as F1×L1<F2×L2.

The operation of the drum brake device is explained next.

As the pressure is applied to the service brake actuator 8, both brake shoes 2, 3 spread open with the point of abutment with the anchor 9 as the fulcrum. The linings 6, 6 frictionally engage with rotating brake drum, not shown in the diagram, thereby braking the brake drum. At this time, one of the brake shoes 2 or 3 functions as self-servo, and the other of the brake shoes 3 or 2 functions as non-servo, thereby having the drum brake device functioning as a LT type brake.

During operation of the parking brake, as shown in FIG. 1, the free end 17b of the brake lever 17 is pulled to the right through the parking brake cable, not shown in the diagram. Then, the brake lever 17 rotates clockwise with the pin 19 as the fulcrum, and the rotating force of the brake lever 17 is transmitted to the strut 18, pivot lever 11, and the shoe clearance adjustment device 12, in that order. Accordingly, the other brake shoe 3 opens with the point of abutment with the anchor 9 as the fulcrum and frictionally engages with the brake drum, not shown in the diagram. Then, the pivot lever 11 rotates counter-clockwise with the point of abutment with the shoe clearance adjustment device 12 as the fulcrum, and the operating force is transmitted to the brake shoe 2 via the protuberance 11a of the pivot lever 11; therefore, the brake shoe 2 opens with the point of abutment with the anchor 9 as the fulcrum to frictionally engage with the brake drum. Also, the reaction force affects on the lower end of the other brake shoe 3 via the pin 19.

At this point, when the vehicle is stopping on an uphill or a downhill slope, as the rotating force in the direction of arrow R is applied to the brake drum, the frictional force of the other brake shoe 3 is transmitted to one brake shoe 2 as an opening force via the shoe clearance adjustment device 12.

When the rotating force is applied in the direction opposite of arrow R, the frictional force of one brake shoe 2 is transmitted to the other brake shoe 3 via the shoe clearance adjustment device 12. Accordingly, when the parking brake is in operation, both brake shoes 2, 3 have the self-servo effects, thereby functioning as a DS type brake.

Figure 6:
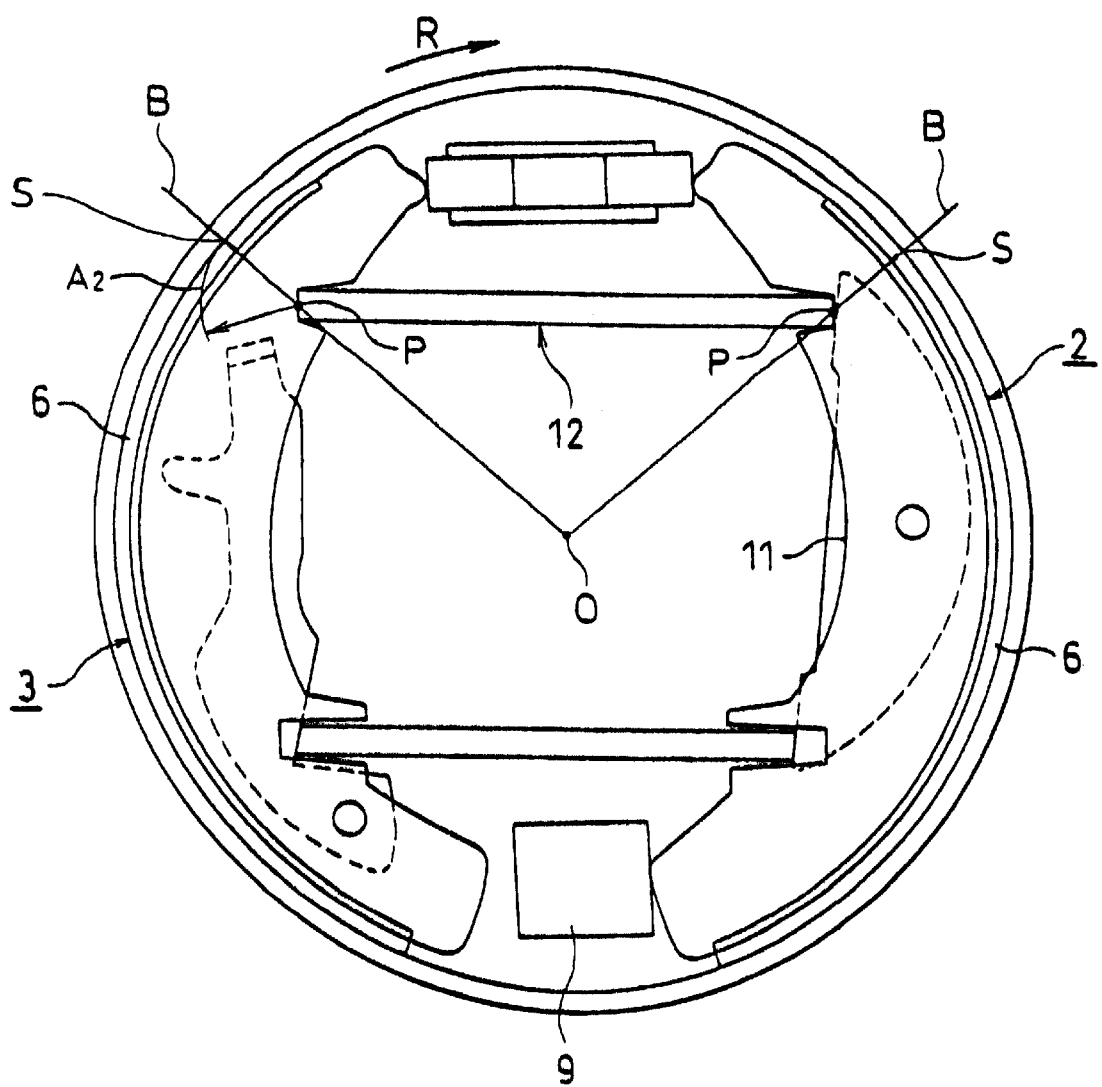
FIG. 6 is an operation model view explaining the operation when releasing the parking brake of the drum brake device of this invention.

In FIG. 6, a figure of a model is disclosed, which describes the operation of the drum brake device in which the parking brake is released without applying the service brake in the condition that the vehicle is stopping on a slope.

When a vehicle begins to move after releasing the parking brake and the brake drum rotates in the direction of arrow R, the point of the circumferential edge s of the lining 6 of the other brake shoe 3 is located on the line B passed through the point of abutment P of the shoe clearance adjustment device 12 with the brake shoe 3 and the brake center O or is located closer to the anchor 9 than the line B. As a result, the point of the circumferential edge s of the lining 6 of the other brake shoe 3, by the return spring force, smoothly moves to the track A2, or, in other words, smoothly moves to the direction to detach from the frictional surface of the brake drum, with the point of abutment P as the fulcrum. This almost returns the device to the starting position same as prior to the braking operation.

Therefore, this invention prevents the brake shoe dragging and prevents the brake shoe from being locked in the same manner as in the conventional devices.

Also, when a vehicle begins to move after releasing the parking brake and the drum rotates in the direction opposite of arrow R, the other brake shoe 3 returns together with the brake drum until contacting the anchor 9 by the return spring force to smoothly return to the starting position.

In addition, even if the vehicle is moving and the drum rotates in the direction opposite of arrow R at the condition that the brake shoe 3 abuts against the anchor block 9 and the brake shoe 3 separates from the anchor block 9 with the parking brake in operation, the same effects as described above can be obviously obtained; therefore, an explanation is omitted here.

Second Embodiment

Figure 7:
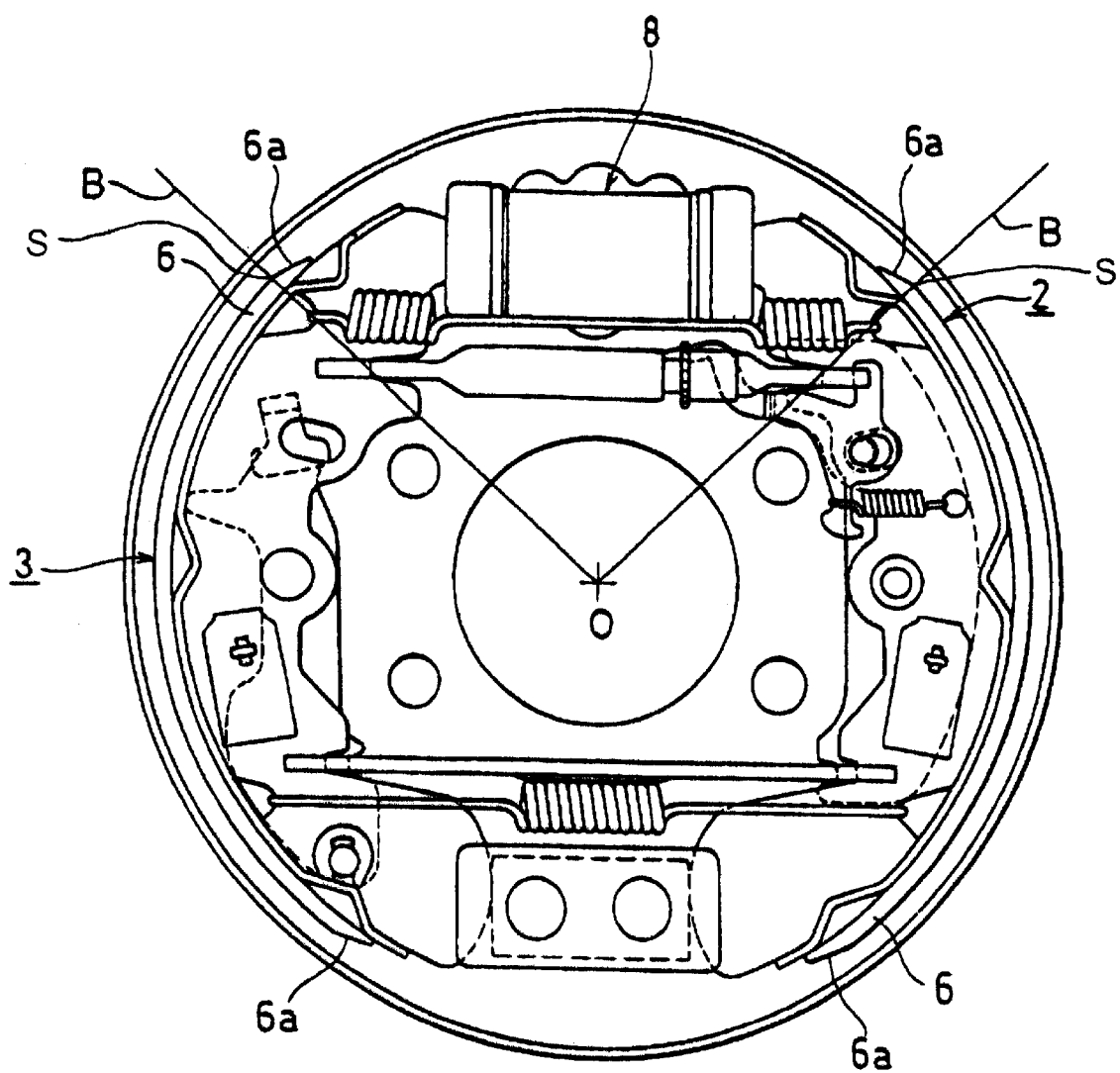
FIG. 7 is a plan view of the chamfer formed on the end of the lining with respect to the second embodiment of the drum brake of this invention.
Figure 8:
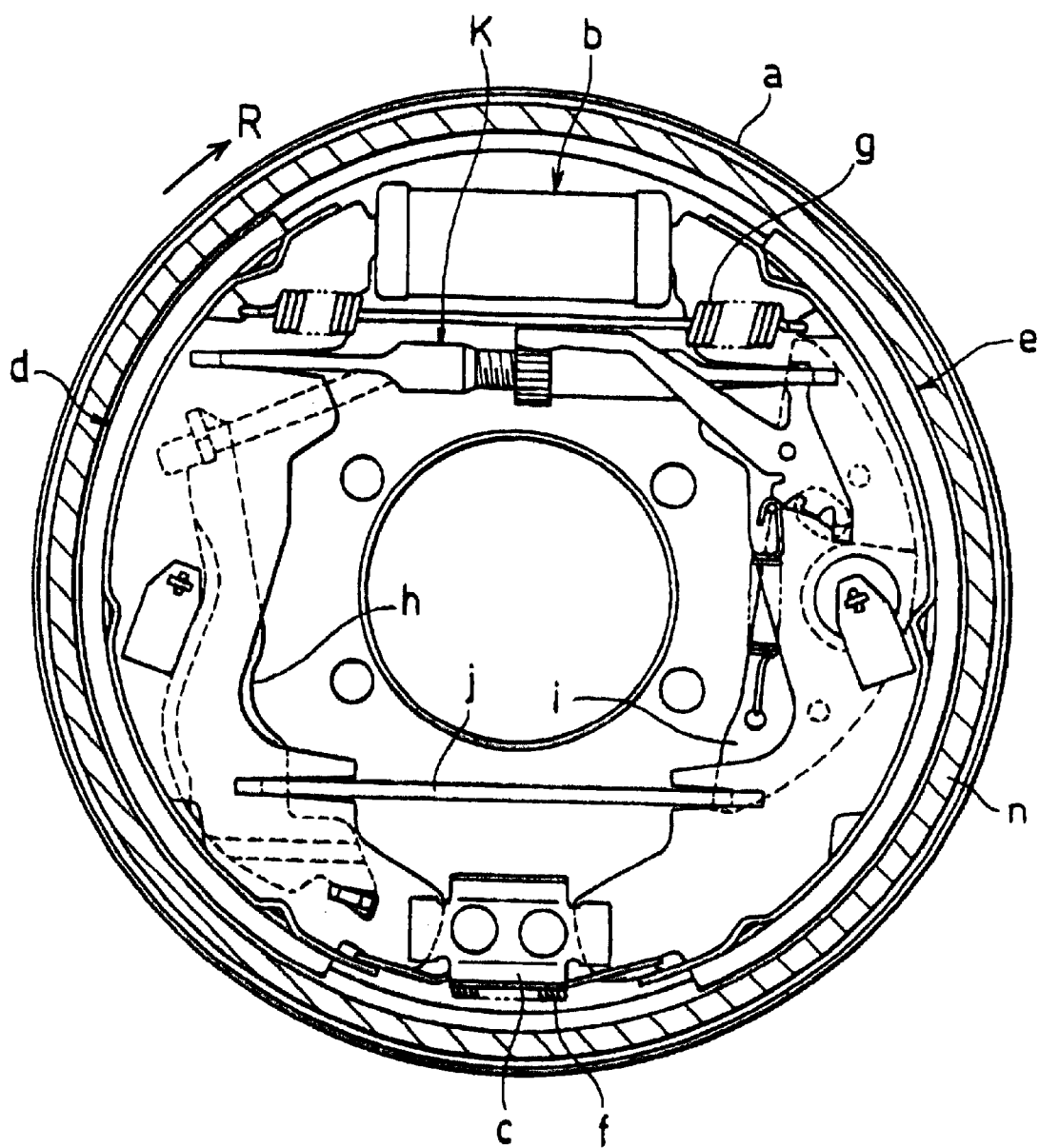
FIG. 8 is a plan view of the conventional drum brake device.
Figure 9:
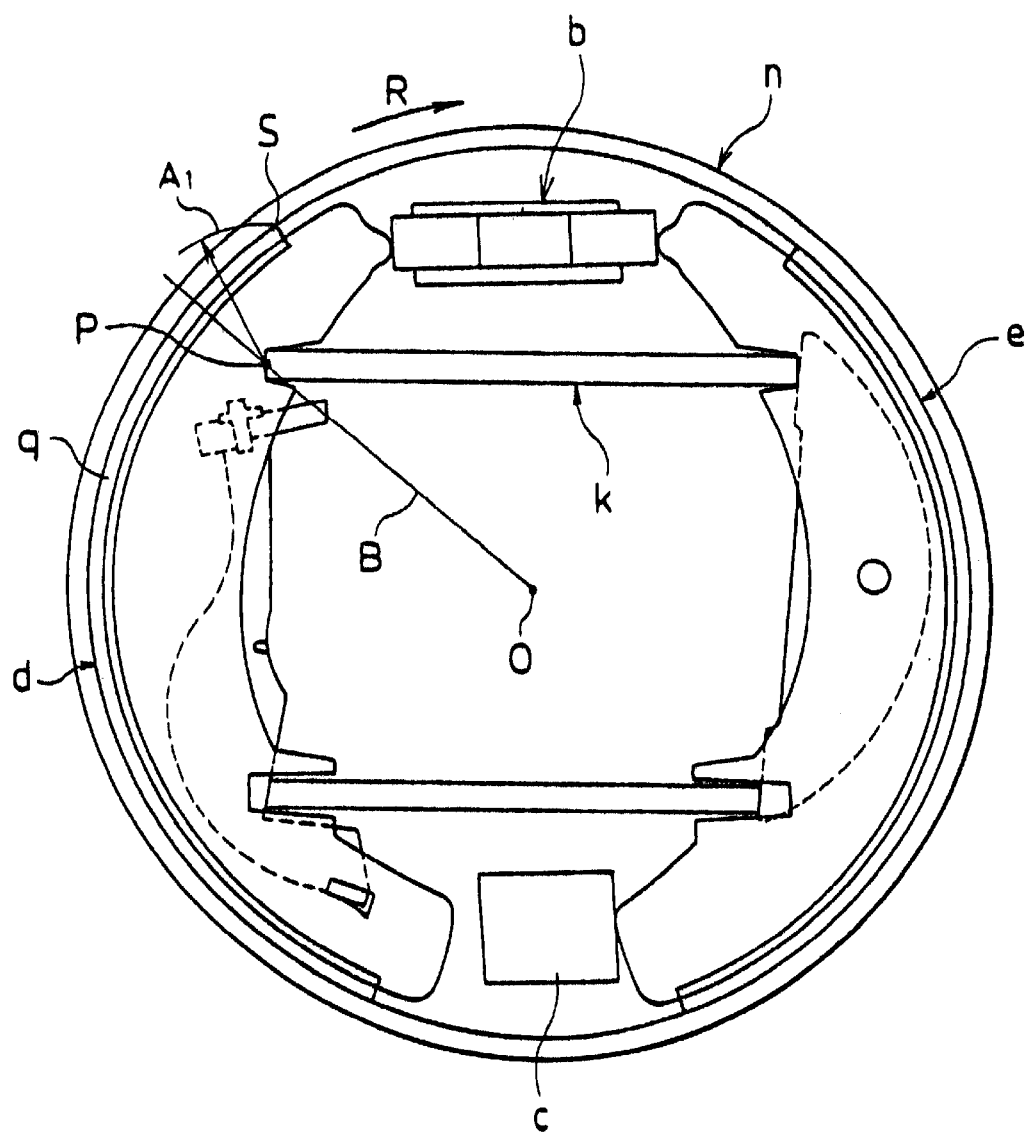
FIG. 9 is an operation model view explaining the operation when releasing the parking brake of the drum brake device in FIG. 8.

As shown in FIG. 7, the chamfers 6a, 6a may be formed at the ends of the linings 6, 6 of the brake shoes 2, 3.

The fixing points of the linings 6, 6 of the brake shoes 2, 3 at the actuator 8 side, i.e., the points of the circumferential edges of the ends s, s of the linings 6, 6, are set to be on the above-mentioned line B or closer to the anchor 9 than the line B, respectively, where the same explanation as in the first embodiment is applicable.

In this embodiment, forming the chamfers 6a, 6a at the ends of the linings 6, 6, avoids the edge being caught on the brake drum, thereby facilitating the influence of the stick-slip which improves the brake judder and brake noise problem by smoothing the contact with the brake drum.

Third Embodiment

The above-described first embodiment deals with the drum brake device with the incremental type automatic adjustment system, where the shoe clearance adjustment device 12 automatically adjusts the clearance between the lining of the brake shoe and the brake drum. However, the automatic adjustment system is not limited to this type, and this invention may be operated with a manual adjustment system instead of the automatic system.

In addition, a cross-pull type parking brake may be used in the parking brake system of the drum brake device.

Also, the above-described first embodiment explains about the drum brake device where the moment of the return springs 21, 22 effecting on the brake shoe 2 is set to establish ascertain relation with other parts. However, this invention is not limited to that embodiment, and the device is applicable as long as the drum brake device is functioning as leading-trailing (LT) type when the service brake in operation and as duo-servo (DS) type when the parking brake in operation.

From the above-described system, this invention has the following effects:

(A) The point of the circumferential edge of the lining of the brake shoe at the side of the service brake actuator is placed on the normal line passed through the point of abutment of the shoe clearance adjustment device with the brake shoe and the brake center or is placed closer to the anchor than that normal line. This realizes a smooth return of the brake shoe when releasing the parking brake in the condition that the vehicle is stopping on a slope, thereby preventing dragging and brake locking.

(B) This invention has another advantage in that it may be applicable to a variety of shoe clearance adjustment devices and parking brake systems.

(C) Chamfers formed on the end of the lining may avoid that the edge caught on the brake drum, so that the lining contacts the brake drum smoothly, which facilitates the influence of the stick-slip, thereby improving problems of brake judder and brake noise.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What we claim is:

1. A drum brake device comprising:

a back plate;

two brake shoes set to face each other on said back plate;

a service brake actuator activated by a service brake mounted on said back plate between one pair of first adjacent ends of said brake shoes;

an anchor mounted on said back plate between the other pair of second adjacent ends of said brake shoes;

a shoe clearance adjustment device provided adjacent to said service brake actuator and provided between said brake shoes;

a parking brake actuator comprising a parking brake lever and a strut adjacent to said anchor;

linings provided on said two brake shoes; and a pivot lever pivotably mounted at the central region of one brake shoe, one end of said pivot lever and the other end of said pivot lever respectively being functionally engaged with said shoe clearance adjustment device and said parking brake actuator; wherein upon activating the parking brake lever, one of said brake shoes abuts against said anchor while the other of said brake shoes is born by said one of said brake shoes via said shoe clearance adjustment device; and a circumferential edge of each lining of each brake shoe at said service brake actuator side nearest said first adjacent ends is positioned at a point on the outermost brake shoe circumference approximately around a cross-point on a normal radial line passing through a point of abutment of said brake shoe with said shoe clearance adjustment device and the brake center without upwardly exceeding said cross-point so that each brake shoe retracts smoothly from a braking state to a non-braking state.

* * * * *